(12) United States Patent
Chinthalapudi et al.

(10) Patent No.: US 12,325,414 B2
(45) Date of Patent: Jun. 10, 2025

(54) METHODS AND SYSTEMS FOR TRACKING OF ATTACHED OBJECTS

(71) Applicant: GM GLOBAL TECHNOLOGY OPERATIONS LLC, Detroit, MI (US)

(72) Inventors: Siva Chinthalapudi, Novi, MI (US); Dmitriy Feldman, West Bloomfield, MI (US); Amanpal S Grewal, Novi, MI (US); Ibrahim Riba, Canton, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 266 days.

(21) Appl. No.: 18/328,153

(22) Filed: Jun. 2, 2023

(65) Prior Publication Data
US 2024/0400041 A1 Dec. 5, 2024

(51) Int. Cl.
*B60W 30/09* (2012.01)
*B60T 7/12* (2006.01)
(Continued)

(52) U.S. Cl.
CPC .............. *B60W 30/09* (2013.01); *B60T 7/12* (2013.01); *B60W 10/04* (2013.01); *B60W 10/18* (2013.01);
(Continued)

(58) Field of Classification Search
CPC ...... B60W 30/09; B60W 10/04; B60W 10/18; B60W 2420/408; B60W 2554/4049;
(Continued)

(56) References Cited

U.S. PATENT DOCUMENTS 8,059,887 B2 * 11/2011 Fields ..................... G06T 7/596
382/141
9,117,272 B2 * 8/2015 Klebanov ................. G06T 7/70
(Continued)

OTHER PUBLICATIONS

G. P. Stein, O. Mano and A. Shashua, "Vision-based ACC with a single camera: bounds on range and range rate accuracy," IEEE IV2003 Intelligent Vehicles Symposium. Proceedings (Cat. No. 03TH8683), Columbus, OH, USA, Jun. 9-11, 2003, pp. 120-125, doi: 10.1109/IVS.Jul. 28, 2003.1212895.

*Primary Examiner* — Hai H Huynh
*Assistant Examiner* — Johnny H Hoang
(74) *Attorney, Agent, or Firm* — Lorenz & Kopf LLP

(57) ABSTRACT

A method and system for tracking attached objects for controlling a vehicle. The method includes receiving, by a processor, sensor data of an environment associated with the vehicle that includes an object. The method includes determining, based on the sensor data, whether the object corresponds to an attached object type, and determining whether the sensor data includes a second vehicle. The method includes determining an attached object region associated with the second vehicle based on a distance between the second vehicle and the vehicle, and determining whether a position of the object is within the attached object region. The method includes determining whether a difference between a velocity of the object and a vehicle velocity of the vehicle is within a velocity threshold based on the distance. The method includes determining that the object is an attached object and controlling the vehicle based on the determining.

20 Claims, 5 Drawing Sheets

(51) Int. Cl.
*B60W 10/04* (2006.01)
*B60W 10/18* (2012.01)
*G01S 13/86* (2006.01)
*G01S 13/931* (2020.01)
*G06T 7/20* (2017.01)
*G06T 7/50* (2017.01)
*G06T 7/60* (2017.01)
*G06T 7/70* (2017.01)
*G06V 10/80* (2022.01)

(52) U.S. Cl.
CPC .......... *G01S 13/865* (2013.01); *G01S 13/867* (2013.01); *G01S 13/931* (2013.01); *G06T 7/20* (2013.01); *G06T 7/50* (2017.01); *G06T 7/60* (2013.01); *G06T 7/70* (2017.01); *B60T 2210/32* (2013.01); *B60W 2420/403* (2013.01); *B60W 2420/408* (2024.01); *B60W 2554/402* (2020.02); *B60W 2554/4049* (2020.02); *B60W 2554/802* (2020.02); *B60W 2554/804* (2020.02); *B60W 2710/18* (2013.01); *G01S 2013/9323* (2020.01); *G06T 2207/30252* (2013.01); *G06V 10/803* (2022.01)

(58) Field of Classification Search
CPC ..... B60W 2554/804; B60W 2554/802; B60W 2554/402; B60W 2710/18; B60W 2420/403; G06T 7/20; G06T 7/50; G06T 7/60; G06T 7/70; G06T 7/73; G06T 7/74; G06T 7/80; G06T 2207/30244; G06T 2207/30252; G06T 2207/30268; G06T 2207/10028; G01S 13/58; G01S 13/865; G01S 13/867; G01S 13/931; B60T 7/12; B60T 2210/32; G03B 17/56; B60R 21/00; G06V 10/803; G06V 20/59; B60Q 1/00; B60Q 23/00; G08B 23/00
USPC .............. 701/41–44, 70–80; 340/425.5, 436, 340/573.1, 632, 963; 348/5.024, 17.002, 348/187, 218.1
See application file for complete search history.

(56) References Cited

U.S. PATENT DOCUMENTS

| | | | | |
|---|---|---|---|---|
| 10,046,761 | B2* | 8/2018 | Meyer | B60W 10/20 |
| 11,568,655 | B2* | 1/2023 | Chao | G06V 10/764 |
| 11,858,529 | B1* | 1/2024 | Costantino | B60W 40/02 |
| 12,039,784 | B1* | 7/2024 | Costantino | G06V 20/56 |
| 2018/0196585 | A1* | 7/2018 | Densham | H04N 9/31 |
| 2019/0120633 | A1* | 4/2019 | Afrouzi | G01S 7/4808 |
| 2019/0164310 | A1* | 5/2019 | Noble | G06T 7/74 |
| 2019/0206084 | A1* | 7/2019 | Noble | G06T 7/73 |

* cited by examiner

METHODS AND SYSTEMS FOR TRACKING OF ATTACHED OBJECTS

INTRODUCTION

The technical field generally relates to systems and methods for controlling a vehicle, and more particularly relates to systems and methods for tracking of an object attached to a second or target vehicle for controlling the vehicle.

Many vehicles may rely on sensors, such as cameras and radar systems, to classify and track objects in an environment surrounding the vehicle. The tracking of objects may be used in various ways to control the vehicle. For example, data from the sensors may be used to determine whether a second vehicle is in front of the vehicle, and the vehicle may be controlled based on this identification of the second vehicle. In certain instances, however, the second vehicle may include one or more objects that are attached to a rear of the second vehicle, which may make it difficult to track the rear of the second vehicle. In these instances, it may be difficult to control the vehicle based on the second vehicle.

Accordingly, it is desirable to provide improved systems and methods for tracking objects attached to vehicles in an environment surrounding a vehicle for controlling the vehicle. Furthermore, other desirable features and characteristics of the present disclosure will become apparent from the subsequent detailed description and the appended claims, taken in conjunction with the accompanying drawings and the foregoing technical field and background.

SUMMARY

According to various embodiments, provided is a method for tracking attached objects for controlling a vehicle. The method includes receiving, by a processor, sensor data of an environment associated with the vehicle observed by at least one radar system associated with the vehicle and at least one of a camera and a lidar associated with the vehicle, the sensor data including an object. The method includes determining, based on the sensor data, whether the object in the environment of the vehicle corresponds to an attached object type, and determining, by the processor, whether the sensor data includes a second vehicle. The method includes determining, by the processor, an attached object region associated with the second vehicle based on a distance between the second vehicle and the vehicle, and determining, by the processor, whether a position of the object is within the attached object region. The method includes based on the determining the object is within the attached object region, determining, by the processor, whether a difference between a velocity of the object and a vehicle velocity of the vehicle is within a velocity threshold based on the distance. The method includes based on the determining the difference is within the velocity threshold, determining, by the processor, that the object is an attached object that is attached to the second vehicle and controlling, by the processor, the vehicle based on the determining that the object is the attached object.

The attached object type includes at least one of a bike, bicycles, a motorcycle, a mobility aid, a scooter, a rack, and a cargo carrier. The determining the attached object region further includes determining, by the processor, a depth and a width of the attached object region based on the distance, and defining the attached object region relative to a fascia the second vehicle based on the depth and the width. The method further includes based on the determining of the attached object, augmenting, by the processor, the fascia of the second vehicle by at least one of an object depth and an object width associated with the attached object to generate an augmented second vehicle boundary that includes the attached object. The controlling the vehicle further includes controlling, by the processor, an automatic braking system of the vehicle based on the augmented second vehicle boundary. The controlling the vehicle further includes controlling, by the processor, a longitudinal control system of the vehicle based on the augmented second vehicle boundary. The method further includes based on the determining the difference is within the velocity threshold, determining, by the processor, whether the difference is within the velocity threshold over a period of time. The determining whether the sensor data includes the second vehicle is based on the determining the object corresponds to the attached object type.

Also provided is a system for tracking attached objects for controlling a vehicle. The system includes a sensor system including at least one radar system and at least one of a camera and a lidar. The sensor system is configured to generate sensor data of an environment associated with the vehicle that includes an object. The system includes a controller, having a processor configured to: determine whether the object in the environment of the vehicle corresponds to an attached object type based on the sensor data; determine whether the sensor data includes a second vehicle; determine an attached object region associated with the second vehicle based on a distance between the second vehicle and the vehicle; determine whether a position of the object is within the attached object region; determine whether a difference between a velocity of the object and a vehicle velocity of the vehicle is within a velocity threshold based on the distance and based on the determination that the object is within the attached object region; determine that the object is an attached object that is attached to the second vehicle based on the determination that the difference is within the velocity threshold; and control the vehicle based on the determination that the object is the attached object.

The attached object type includes at least one of a bike, bicycles, a motorcycle, a mobility aid, a scooter, a rack, and a cargo carrier. The attached object region includes a depth and a width based on the distance, and the processor is configured to define the attached object region relative to a fascia the second vehicle based on the depth and the width. The processor is configured to augment the fascia of the second vehicle by at least one of an object depth and an object width of the attached object to generate an augmented second vehicle boundary that includes the attached object. The processor is configured to control the vehicle by outputting the augmented second vehicle boundary to an automatic braking system of the vehicle. The processor is configured to control the vehicle by outputting the augmented second vehicle boundary to a longitudinal control system of the vehicle. The processor is configured to determine whether the difference is within the velocity threshold over a period of time. The processor is configured to determine whether the sensor data includes the second vehicle based on the determination that the object corresponds to the attached object type.

Further provided is a method for tracking attached objects for controlling a vehicle. The method includes receiving, by a processor, sensor data of an environment associated with the vehicle observed by at least one radar system associated with the vehicle and at least one of a camera and a lidar associated with the vehicle. The sensor data includes an object. The method includes determining, based on the sensor data, whether the object in the environment of the vehicle matches an attached object type, and determining, by the processor, whether the sensor data includes a second vehicle. The method includes determining, by the processor, an attached object region associated with the second vehicle based on a distance between the second vehicle and the vehicle. The attached object region includes a depth and a width based on the distance. The method includes defining, by the processor, the attached object region relative to a fascia the second vehicle based on the depth and the width, and determining, by the processor, whether a position of the object is within the attached object region. The method includes based on the determining the object is within the attached object region, determining, by the processor, whether a difference between a velocity of the object and a vehicle velocity of the vehicle is within a velocity threshold based on the distance. The method includes based on the determining the difference is within the velocity threshold, determining, by the processor, that the object is an attached object that is attached to the second vehicle, and controlling, by the processor, at least one of a longitudinal control system and an automatic braking system associated with the vehicle based on the determining that the object is the attached object.

The attached object type includes at least one of a bike, bicycles, a motorcycle, a mobility aid, a scooter, a rack, and a cargo carrier. The method further includes based on the determining of the attached object, augmenting, by the processor, the fascia of the second vehicle by at least one of an object depth and an object width of the attached object to generate an augmented second vehicle boundary that includes the attached object. The determining whether the sensor data includes the second vehicle is based on the determining the object matches the attached object type.

BRIEF DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding introduction, brief summary or the following detailed description. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein are merely exemplary embodiments of the present disclosure.

For the sake of brevity, conventional techniques related to signal processing, data transmission, signaling, control, machine learning models, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure. As used herein, the term "about" denotes within 10%, and the term "substantially" denotes within 10%.

Figure 1:
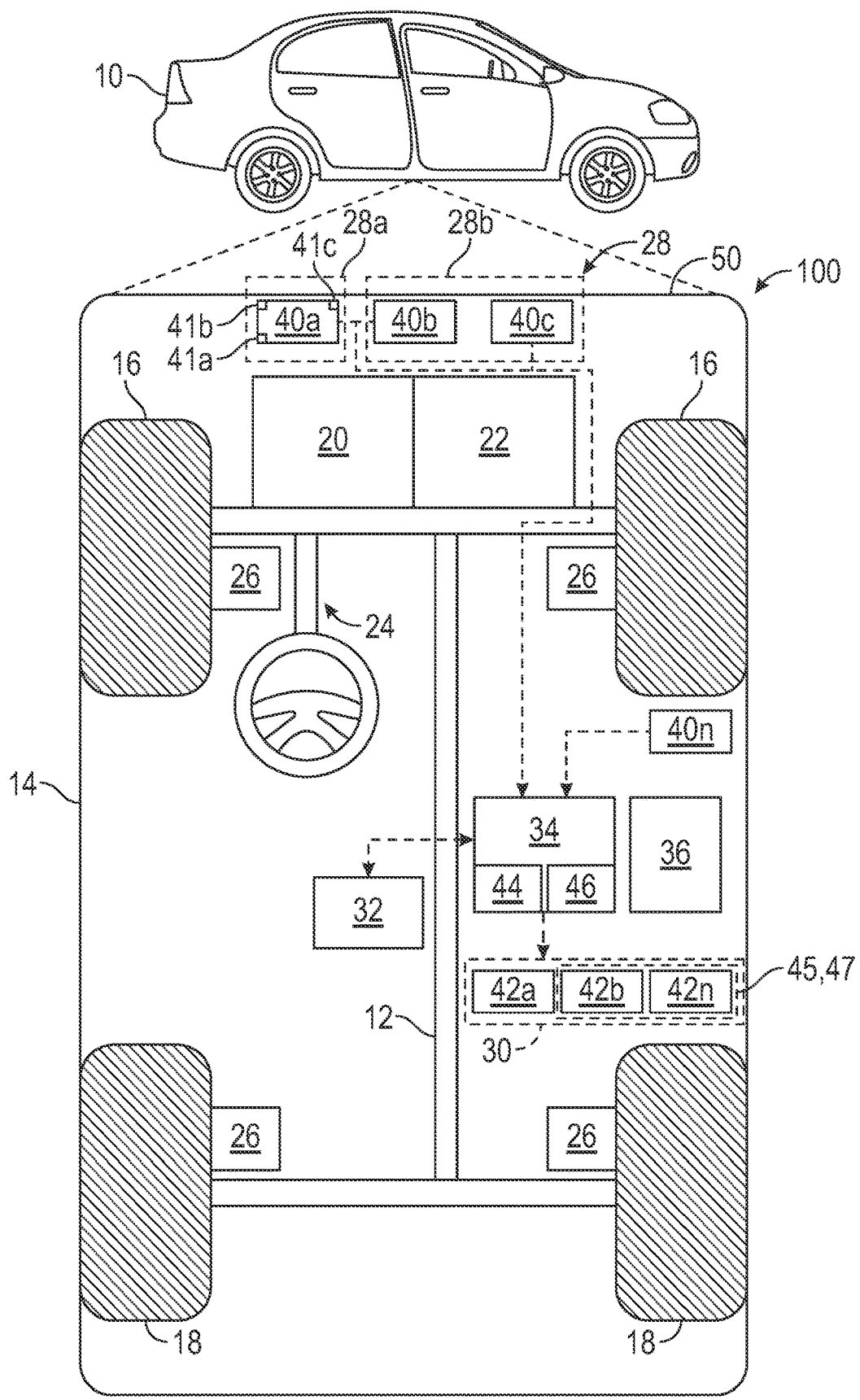
FIG. 1 is a functional block diagram illustrating a vehicle including a tracking control system, in accordance with various embodiments.
Figure 2:
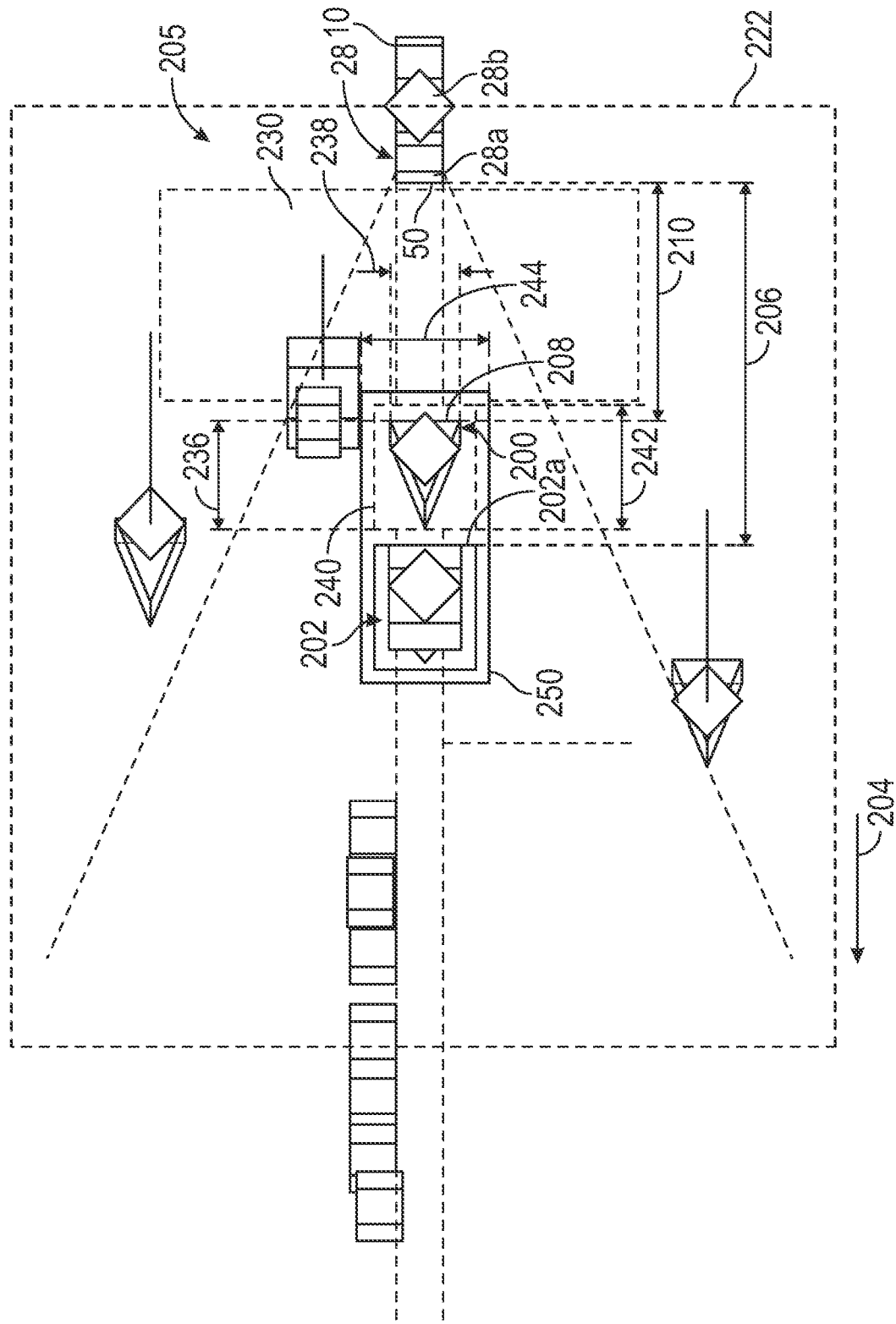
FIG. 2 is a schematic environmental illustration of the vehicle, which includes the tracking control system, and a second vehicle or target vehicle with an attached object, in accordance with various embodiments.

With reference to FIG. 1, a tracking control system shown generally as 100 is associated with a vehicle 10 in accordance with various embodiments. In general, the tracking control system (or simply "system") 100 generates one or more control signals for controlling a brake system and/or a propulsion system associated with the vehicle 10 based on a determination of an attached object 200 on a second or target vehicle 202 (FIG. 2). In various embodiments, the tracking control system 100 generates the one or more control signals based on information obtained from a sensor system of the vehicle 10 and/or from one or more modules associated with the vehicle 10. By controlling the brake system and/or propulsion system of the vehicle 10 based on the attached object 200, inadvertent braking of the vehicle 10 by the brake system and/or inadvertent acceleration by the propulsion system is inhibited.

As depicted in FIG. 1, the vehicle 10 generally includes a chassis 12, a body 14, front wheels 16, and rear wheels 18. The body 14 is arranged on the chassis 12 and substantially encloses components of the vehicle 10. The body 14 and the chassis 12 may jointly form a frame. The vehicle wheels 16-18 are each rotationally coupled to the chassis 12 near a respective corner of the body 14.

In various embodiments, the vehicle 10 is an autonomous vehicle or a semi-autonomous vehicle. As can be appreciated, the tracking control system 100 can be implemented in other non-autonomous systems and is not limited to the present embodiments. The vehicle 10 is depicted in the illustrated embodiment as a passenger car, but it should be appreciated that any other vehicle, including motorcycles, trucks, sport utility vehicles (SUVs), recreational vehicles (RVs), marine vessels, aircraft, etc., can also be used.

As shown, the vehicle 10 generally includes a propulsion system 20, a transmission system 22, a steering system 24, a brake system 26, a sensor system 28, an actuator system 30, and at least one controller 34. The propulsion system 20 may, in various embodiments, include an internal combustion engine, an electric machine such as a traction motor, and/or a fuel cell propulsion system.

The transmission system 22 is configured to transmit power from the propulsion system 20 to the vehicle wheels 16 and 18 according to selectable speed ratios. According to various embodiments, the transmission system 22 may include a step-ratio automatic transmission, a continuously-variable transmission, or other appropriate transmission.

The brake system 26 is configured to provide braking torque to the vehicle wheels 16 and 18. Brake system 26 may, in various embodiments, include friction brakes, brake by wire, a regenerative braking system such as an electric machine, and/or other appropriate braking systems. The steering system 24 influences a position of the vehicle wheels 16 and/or 18. While depicted as including a steering wheel for illustrative purposes, in some embodiments contemplated within the scope of the present disclosure, the steering system 24 may not include a steering wheel.

The sensor system 28 includes one or more sensing devices 40a-40n that sense observable conditions of the exterior environment and/or the interior environment of the vehicle 10. In various embodiments, the sensing devices 40a-40n include, but are not limited to, radars (e.g., long-range, medium-range, short range), lidars, global positioning systems, optical cameras (e.g., forward facing, 360-degree, rear-facing, side-facing, stereo, etc.), thermal (e.g., infrared) cameras, ultrasonic sensors, odometry sensors (e.g., encoders) and/or other sensors that might be utilized in connection with systems and methods in accordance with the present subject matter. In one example, the sensing devices 40a-40n include at least one medium or short-range sensing device 28a, such as a medium or short-range radar system 40a, and at least one long-range sensing device 28b, such as an optical camera 40b and/or a long-range lidar 40c. The sensing devices 40a-40n are in communication with the controller 34 via a communication architecture that facilitates the transfer of data, power, commands, etc., including, but not limited to, a bus.

Generally, the medium or short-range radar system 40a includes a transceiver module 41a, one or more transmitting antennas 41b and one or more receiving antennas 41c. The transceiver module 41a is in communication with the transmitting antennas 41b and the receiving antennas 41c. The transmitting antennas 41b radiate a radio frequency signal and the receiving antennas 41c detect any reflections from potential objects. The transceiver module 41a receives control signals from the controller 34 to radiate the radio frequency signal via the transmitting antennas 41b and transmits received signals from the receiving antennas 41c to the controller 34. Based on the received signals, the controller 34 determines whether an object has been detected. It should be noted that the position of the medium or short-range radar system 40a in FIG. 1 is merely exemplary, as the medium or short-range radar system 40a may be positioned at any desired location about the vehicle 10, and moreover, the vehicle 10 may include more than one medium or short-range radar system 40a.

In one example, the optical camera 40b comprises a stereo camera assembly capable of capturing stereo images with depth information. For example, the optical camera 40b may include a stereo camera with two or more lenses and image sensors arranged to capture stereoscopic images about the environment surrounding the vehicle 10 with depth information. In this example, the optical camera 40b is a long-range stereo camera for capturing images over an extended distance with depth information and is coupled proximate a front fascia or front 50 of the vehicle 10. For example, the optical camera 40b may be coupled to a windshield of the vehicle 10 and/or a front grille of the vehicle 10. Images may be captured by the optical camera 40b according to various timings or other considerations. In certain examples, the optical camera 40b may capture images continuously as the vehicle 10 moves (based on one or more control signals from the controller 34).

The long-range lidar 40c may include or incorporate one or more lasers, scanning components, optical arrangements, photodetectors, and other components suitably configured to horizontally and rotatably scan the environment in the vicinity of the vehicle 10 with a particular angular frequency or rotational velocity. It should be noted that the position of the optical camera 40b and the long-range lidar 40c in FIG. 1 is merely exemplary, as the optical camera 40b and the long-range lidar 40c may be positioned at any desired location about the vehicle 10, and moreover, the vehicle 10 may include more than one optical camera 40b and/or long-range lidar 40c.

Generally, each of the sensing devices 40a-40n is fixedly coupled to the vehicle 10 in a location that is known in the vehicle coordinate system associated with the vehicle 10. Stated another way, the location of the sensing devices 40a-40n is fixed to the vehicle 10 such that the location (position and pose) and orientation of the respective sensing devices 40a-40n is known to the controller 34 or pre-calibrated. Generally, each of the sensing devices 40a-40n on the vehicle 10 has a field of view, and the coordinate location (X, Y, Z) of the sensing devices 40a-40n on the vehicle 10 and the field of view of the sensing devices 40a-40n in the vehicle coordinate system is known to the controller 34.

The actuator system 30 includes one or more actuator devices 42a-42n that control one or more vehicle features such as, but not limited to, the propulsion system 20, the transmission system 22, the steering system 24, and the brake system 26. In various embodiments, the vehicle 10 may also include interior and/or exterior vehicle features not illustrated in FIG. 1, such as various doors, a trunk, and cabin features such as air, music, lighting, touch-screen display components (such as those used in connection with a navigation system), active safety seat or haptic seat, and the like. In various embodiments, one or more of the actuator devices 42a-42n may control the propulsion system 20 and/or the brake system 26 based on the attached object 200 associated with the target vehicle 202 (FIG. 2). In various embodiments, one or more of the actuator devices 42a-42n control the one or more vehicle features, such as the brake system 26 and the propulsion system 20, to maintain a speed of vehicle 10 and act as a longitudinal control system 45, including, but not limited to an adaptive cruise control system, such as adaptive cruise control or super cruise control. In various embodiments, one or more of the actuator devices 42a-42n control the one or more vehicle features, such as the brake system 26, to decelerate the vehicle 10 and act as an automatic braking system 47.

The controller 34 includes at least one processor 44 and a computer-readable storage device or media 46. The processor 44 may be any custom-made or commercially available processor, a central processing unit (CPU), a graphics processing unit (GPU), an application specific integrated circuit (ASIC) (e.g., a custom ASIC implementing a neural network), a field programmable gate array (FPGA), an auxiliary processor among several processors associated with the controller 34, a semiconductor-based microprocessor (in the form of a microchip or chip set), any combination thereof, or generally any device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media 46 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 34 in controlling the vehicle 10. In various embodiments, controller 34 is configured to implement instructions of the tracking control system 100 as discussed in detail below. In various embodiments, the instructions, when executed by the processor, receive and process sensor data from the sensor system 28 of the vehicle 10 and data received from other modules associated with the vehicle 10 to determine whether to control the vehicle 10 based on the attached object 200 (FIG. 2).

Briefly, with reference to FIG. 2, FIG. 2 is a schematic environmental illustration of the vehicle 10. The vehicle 10 is moving in a direction of travel 204 within an environment 205. A rear fascia or rear 202a of the target vehicle 202 is positioned a distance 206 from the front 50 of the vehicle 10 in the direction of travel 204. In this example, the target vehicle 202 is generally directly in front of the vehicle 10 in the direction of travel 204 such that one or more modules associated with the vehicle 10 may make decisions based on the target vehicle 202. As will be discussed, data from the sensor system 28 may be used by the controller 34 to determine the position and location of the target vehicle 202 relative to the vehicle 10. The longitudinal control system 45 associated with the vehicle 10 may control the brake system 26 and/or the propulsion system 20 based on a proximity of the front 50 of the vehicle 10 to the rear 202a of the target vehicle 202 or based on the distance 206.

In one example, the target vehicle 202 includes the attached object 200, which has an object rear 208 that is spaced a second distance 210 from the front 50 of the vehicle 10 in the direction of travel 204. The second distance 210 is different and less than the distance 206. Generally, as used herein "attached object" 200 refers to any object capable of being attached (removably or fixably) to the rear 202a of the target vehicle 202, such that the attached object 200 moves with the target vehicle 202. The attached object 200 includes, but is not limited to bicycles, motorbikes, mobility aids, racks, cargo carriers, etc. In certain examples, the target vehicle 202 may include a hitch, and the attached object 200 may be coupled to the hitch. In other examples, the attached object 200 may be coupled directly to the rear 202a of the target vehicle 202. Thus, generally, the attached object 200 is coupled to the target vehicle 202 so as to partially, but substantially not fully, obscure the rear 202a of the target vehicle 202. Generally, the attached object 200 does not include trailers coupled to the hitch of the target vehicle 202.

In the instances in which the rear 202a of the target vehicle 202 is partially obscured, the longitudinal control system 45 may control the brake system 26 and/or the propulsion system 20 based on the distance 206 or the second distance 210. This may lead to inadvertent braking or acceleration of the vehicle 10. Similarly, the automatic braking system 47 (FIG. 1) associated with the vehicle 10 may control the brake system 26 based on the distance 206 or the second distance 210. This may lead to inadvertent braking of the vehicle 10. The inadvertent braking and/or acceleration of the vehicle 10 is undesirable to the occupants of the vehicle 10. As will be discussed, the tracking control system 100 determines whether the target vehicle 202 has the attached object 200, and based on the determination, augments the rear 202a of the target vehicle 202 to include the attached object 200 or forms an augmented target vehicle boundary 250. By forming the augmented target vehicle boundary 250, the tracking control system 100 ensures that the longitudinal control system 45 and the automatic braking system 47 control the respective one of the brake system 26 and/or the propulsion system 20 based on the augmented target vehicle boundary 250, and thus, reduces inadvertent braking and/or acceleration of the vehicle 10, respectively, based the attached object 200.

Figure 3:
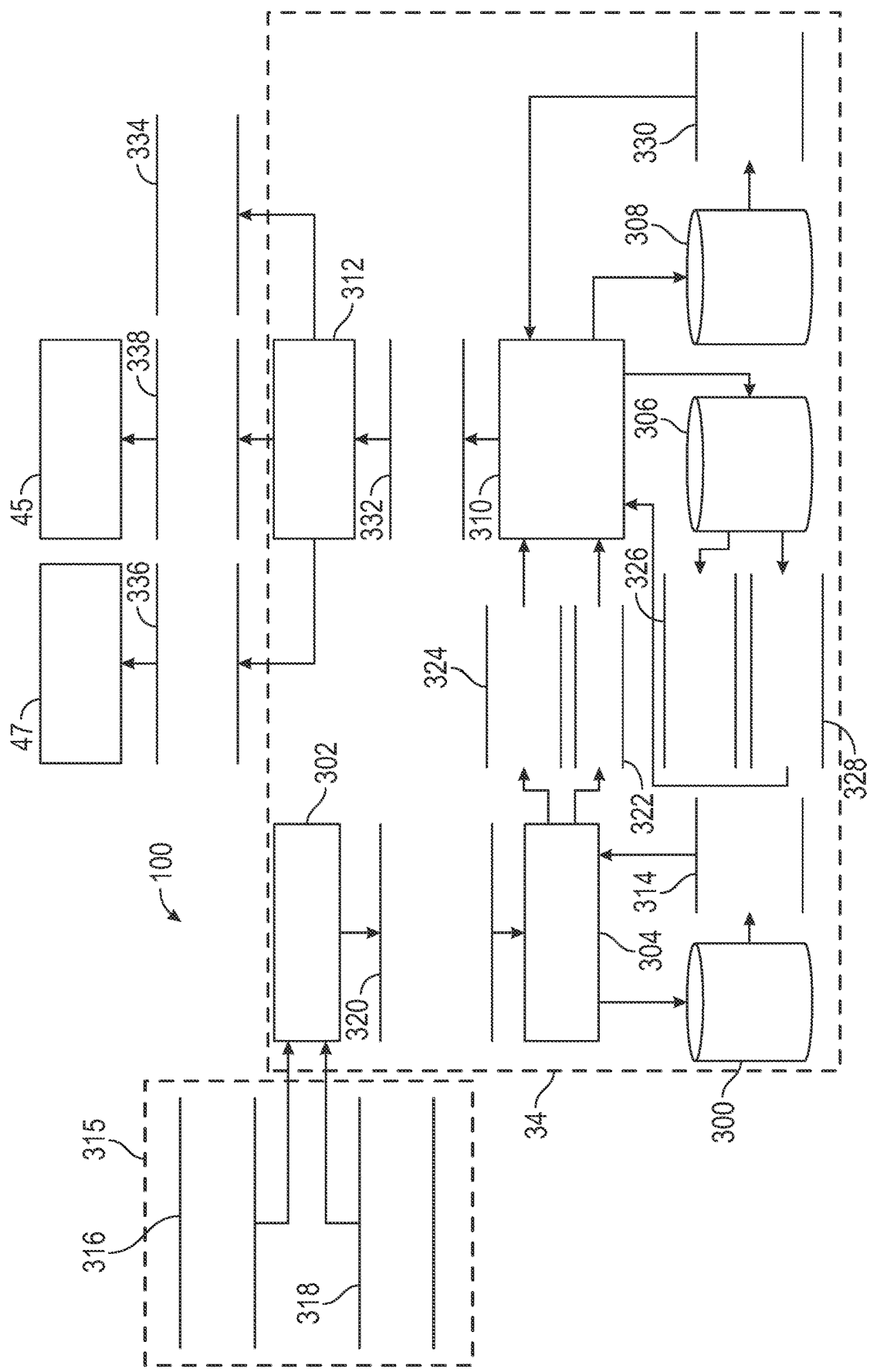
FIG. 3 is a dataflow diagram illustrating the tracking control system of the vehicle in accordance with various embodiments.

As shown in more detail with regard to FIG. 3 and with continued reference to FIGS. 1-2, a dataflow diagram illustrates various embodiments of the tracking control system 100, which may be embedded within the controller 34. Various embodiments of the tracking control system 100 according to the present disclosure can include any number of sub-modules embedded within the controller 34. As can be appreciated, the sub-modules shown in FIG. 3 can be combined and/or further partitioned to control the vehicle 10 based on the detection of the attached object 200. Inputs to the tracking control system 100 may be received from the sensor system 28 (FIGS. 1 and 2), received from other control modules (not shown) associated with the vehicle 10, and/or determined/modeled by other sub-modules (not shown) within the controller 34. In various embodiments, the tracking control system 100 includes an attached object datastore 300, a sensor fusion module 302, an attached object monitor module 304, a threshold datastore 306, an object region datastore 308, an attached object determination module 310 and an attached object control module 312.

The attached object datastore 300 stores data of a list of attached object types that may be identified in the environment surrounding the vehicle 10, along with dimensions associated with the attached object type. For example, the attached object datastore 300 stores a list of attached object types or attached object list data 314, which includes, but is not limited to, a bike, bicycles, motorcycle, mobility aid (wheelchair, motorized wheelchair), scooter, rack, cargo carrier, etc. and dimensions (an object depth 236 and an object width 238) associated with each of the attached object types. Stated another way, for each of the attached object types, the attached object list data 314 includes the object depth 236 and the object width 238 associated with the particular attached object type. The object depth 236 and the object width 238 of the attached object type may be known or predefined, factory set values. In other embodiments, the object depth 236 and the object width 238 of the attached object type may be observed by the sensor system 28.

The sensor fusion module 302 receives as input sensor data 315. In one example, the sensor fusion module 302 receives as input medium or short-range sensor data 316. The medium or short-range sensor data 316 is data from the medium or short-range radar system 40a of the sensor system 28. The sensor fusion module 302 also receives as input long-range sensor data 318. The long-range sensor data 318 is data from the long-range sensors, such as the optical camera 40b and/or the long-range lidar 40c. In the example of the optical camera 40b, the long-range sensor data 318 is the camera images generated by the optical camera 40b. In the example of the long-range lidar 40c, the data includes a lidar point cloud generated by the long-range lidar 40c. In one example, with reference back to FIG. 2, the medium or short-range sensor data 316 may include data observed by the medium or short-range radar system 40a within a medium or short-range field of view 220 at the front 50 of the vehicle 10, which is generally indicated by a dashed box. The long-range sensor data 318 may include data observed by the optical camera 40b and/or the long-range lidar 40c within a long-range field of view 222 at the front 50 of the vehicle 10, which is generally indicated by a dashed box.

The sensor fusion module 302 fuses the medium or short-range sensor data 316 and the long-range sensor data 318 to generate an environmental model of the environment 205 around the vehicle 10. In one example, the sensor fusion module 302 synthesizes and processes medium or short-range radar system 40a and the long-range sensor data 318, and predicts the presence, location, classification, and/or path of objects and features of the environment 205 of the vehicle 10. The sensor fusion module 302 sets vehicle environment data 320 for the attached object monitor module 304. The vehicle environment data 320 includes a list of the types of objects identified in the environment 205 of the vehicle 10, which includes a coordinate location (X, Y, Z) or position of the object within the environment 205, dimensions of the object (width, depth), a velocity of the object within the environment 205 in both the X-direction and the Y-direction, a distance of the object from the vehicle 10, the sensing device 40a-40n that detected the object within the environment 205 (such as the medium or short-range radar system 40a, the optical camera 40b and/or the long-range lidar 40c), etc.

The attached object monitor module 304 receives as input the vehicle environment data 320. The attached object monitor module 304 retrieves the attached object list data 314 from the attached object datastore 300 and compares the attached object list data 314 to the vehicle environment data 320. The attached object monitor module 304 determines whether an object in the attached object list data 314 is listed in the vehicle environment data 320. Based on the determination that an object in the vehicle environment data 320 matches the attached object list data 314, the attached object monitor module 304 determines whether a second vehicle, such as the target vehicle 202, is listed in the vehicle environment data 320. The vehicle or target vehicle 202 identified in the vehicle environment data 320 includes, but is not limited to a passenger car, truck, sport utility vehicle (SUV), recreational vehicle (RV), etc. If a second vehicle, such as the target vehicle 202, is listed in the vehicle environment data 320, the attached object determination module 310 determines whether the second vehicle, such as the target vehicle 202, was identified by the medium or short-range radar system 40a and at least one of the optical camera 40b and the long-range lidar 40c. If true, the attached object determination module 310 sets object data 322 and the target vehicle data 324 for the attached object determination module 310. The object data 322 includes the identified object from the vehicle environment data 320, along with the velocity of the object, the position of the object and the dimensions of the object (the object depth 236 and the object width 238). The target vehicle data 324 includes data associated with the second vehicle or the target vehicle 202 from the vehicle environment data 320, including the position of the target vehicle 202, the vehicle velocity or velocity of the target vehicle 202, and a distance of the target vehicle 202 to the vehicle 10.

The threshold datastore 306 stores data of threshold values, and in one example, the threshold datastore 306 stores velocity threshold data 326 and timer threshold data 328. In one example, the threshold datastore 306 stores a correlation table that correlates the between the target vehicle 202 and the vehicle 10 to the velocity threshold data 326. Thus, the threshold datastore 306 stores one or more lookup tables, which provide the velocity threshold data 326 that corresponds with the distance between the target vehicle 202 and the vehicle 10. For example, the threshold datastore 306 stores the following table:

TABLE 1

Correlation Table for Velocity Threshold Based on Distance from Vehicle

| Distance From Vehicle 10 in meters (m) (distance 206) | Velocity Threshold X-Direction in meters per second (m/s) ($V_{err}$) | Velocity Threshold Y-Direction in meters per second (m/s) |
| --- | --- | --- |
| 10 m | 0.5 m/s | 0.1 m/s |
| 20 m | 0.75 m/s | 0.2 m/s |
| 50 m | 1.5 m/s | 0.3 m/s |
| 75 m | 2 m/s | 0.3 m/s |
| 100 m | 2.5 m/s | 0.3 m/s |
| 150 m or greater | 3 m/s | 0.3 m/s |

Thus, the velocity threshold data 326 includes a velocity threshold in the X-direction and a velocity threshold in the Y-direction based on a distance of the target vehicle 202 to the vehicle 10. In one example, the distance from the vehicle 10 is the distance between the vehicle 10 and the target vehicle 202, or the distance 206. In addition, the threshold datastore 306 stores the timer threshold data 328. The timer threshold data 328 is a predefined or predetermined value for a timer of the tracking control system 100. In one example, the timer threshold data 328 is about 100 milliseconds (ms) to about 1 second(s).

Figure 3A:
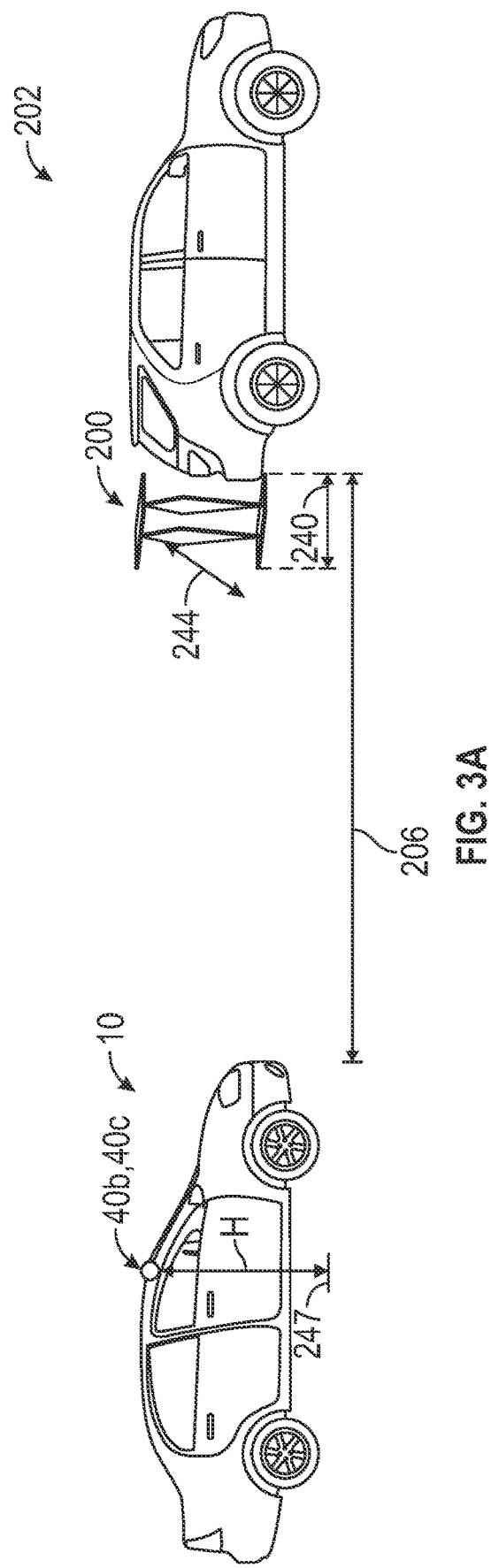
FIG. 3A is a schematic environmental illustration of the vehicle, which includes the tracking control system, and the second vehicle or target vehicle with the attached object, in accordance with various embodiments.

In one example, the correlation table for the velocity threshold in X-direction based on the distance 206 may be populated using the following equation:

$$V_{err} = \frac{Z^2 S_{err}}{fW\Delta T} + \frac{Zv}{fH} \qquad (1)$$

Wherein $V_{err}$ is the velocity threshold in the X-Direction in meters per second (m/s); Z is the distance 206 between the vehicle 10 and the target vehicle 202 in meters (m); $S_{err}$ is an alignment error of the long-range sensing device 28b, such as the optical camera 40b or the long-range lidar 40c, which is a known, predefined value; v is the relative velocity of the target vehicle 202 in meters per second (m/s), which is provided in the vehicle environment data 320; W is the width of the target vehicle 202 in meters (m), which is provided in the vehicle environment data 320; $\Delta T$ is a sampling rate associated with the long-range sensing device 28b in milliseconds (ms), and in the example of the optical camera 40b, $\Delta T$ is a difference in time between a first frame and a second frame in seconds milliseconds (ms), and in one example is about 25 milliseconds (ms); f is the focal length of the long-range sensing device 28b, such as the optical camera 40b or the long-range lidar 40c in meters (m), which is a known, predefined value; and with additional reference to FIG. 3A, H is a height of the long-range sensing device 28b on the vehicle 10 as measured from a ground surface 247 in meters (m). The equation (1) may be used to calculate the velocity threshold in the X-direction for a number of predefined driving scenarios, and the values in Table 1 are predetermined based on the greatest velocity threshold in the X-direction calculated for the particular distance 206. Generally, the velocity threshold in the Y-direction is predetermined or predefined for each distance 206.

The object region datastore 308 stores a correlation table that correlates the distance between the target vehicle 202 and the vehicle 10 to an attached object area or region 240 defined at the rear 202a of the target vehicle 202. With brief reference to FIG. 2, the attached object region 240 is shown in broken lines. In one example, the attached object region 240 has a depth 242 and a width 244. With reference back to FIG. 3, the object region datastore 308 stores one or more lookup tables, which provide dimension data 330 for the attached object region 240 that corresponds with the distance between the target vehicle 202 and the vehicle 10. For example, the object region datastore 308 stores the following table:

TABLE 2

Correlation Table for Attached Object Region Dimensions Based on Distance from Vehicle

| Distance From Vehicle 10 in meters (m) (distance 206) | Attached Object Region Depth in meters (m) (depth 242) | Attached Object Region Width in meters (m) (width 244) |
| --- | --- | --- |
| 10 m | 1.0 m | 2.1 m |
| 20 m | 1.5 m | 2.2 m |
| 50 m | 2.0 m | 2.4 m |
| 75 m | 3.0 m | 2.6 m |
| 100 m | 5.0 m | 2.8 m |
| 150 m or greater | 10.0 m | 3 m |

Thus, the dimension data 330 includes the depth 242 of the attached object region 240 and a width 244 of the attached object region 240 based on a distance of the target vehicle 202 to the vehicle 10.

In one example, the depth 242 of the attached object region 240 is populated based on the following equation:

$$Z_{err} = \frac{Z^2}{fH} \quad (2)$$

Wherein $Z_{err}$ is the depth 242 of the attached object region 240 in meters (m); Z is the distance 206 between the vehicle 10 and the target vehicle 202 in meters (m); f is the focal length of the long-range sensing device 28b, such as the optical camera 40b or the long-range lidar 40c in meters (m); and H is a height of the long-range sensing device 28b on the vehicle 10 as measured from the ground surface 247 in meters (m). The equation (2) may be used to calculate the depth 242 of the attached object region 240 for a number of predefined driving scenarios, and the values in Table 2 are predetermined based on the greatest depth 242 calculated for the particular distance 206. Generally, the width 244 is predetermined or predefined for each distance 206.

The attached object determination module 310 receives as input the target vehicle data 324. Based on the distance of the target vehicle 202 to the vehicle 10 provided by the target vehicle data 324, the attached object determination module 310 queries the object region datastore 308, and retrieves the dimension data 330 from the object region datastore 308. The attached object determination module 310 processes the dimension data 330 and the position of the target vehicle 202, and defines the attached object region 240 at the rear 202a of the target vehicle 202 with the depth 242 and the width 244 provided by the dimension data 330.

The attached object determination module 310 receives as input the object data 322. The attached object determination module 310 determines whether the position of the object provided in the object data 322 is within the attached object region 240 at the rear 202a of the target vehicle 202 that has been defined based on the dimension data 330 and the position of the target vehicle 202. If the position of the object is within the attached object region 240, the attached object determination module 310 sets a timer equal to zero. The attached object determination module 310 queries the threshold datastore 306, and retrieves the velocity threshold data 326. The attached object determination module 310 determines the difference between the velocity of the target vehicle 202 in the X-direction (provided by the target vehicle data 324) and the velocity of the object in the X-direction (provided by the object data 322). The attached object determination module 310 determines whether the difference between the velocity of the target vehicle 202 and the object in the X-direction is within the threshold for the velocity in the X-direction provided by the velocity threshold data 326. The attached object determination module 310 determines the difference between the velocity of the target vehicle 202 in the Y-direction (provided by the target vehicle data 324) and the velocity of the object in the Y-direction (provided by the object data 322). The attached object determination module 310 determines whether the difference between the velocity of the target vehicle 202 and the object in the Y-direction is within the threshold for the velocity in the Y-direction provided by the velocity threshold data 326. By determining whether the differences between the velocity of the target vehicle 202 and the object are within the velocity threshold data 326 in the X and Y-directions, the attached object determination module 310 ensures that the object is moving with the target vehicle 202 as if it were attached to the target vehicle 202.

If the differences between the velocity of the target vehicle 202 and the object are within the velocity threshold data 326 in the X and Y-directions, the attached object determination module 310 queries the threshold datastore 306 and retrieves the timer threshold data 328. The attached object determination module 310 determines whether the time of timer is greater than the time threshold value provided by the timer threshold data 328.

Once the timer is greater than the timer threshold value provided by the timer threshold data 328, the attached object determination module 310 determines the object is attached to the target vehicle 202 or is the attached object 200, and sets attached object data 332 for the attached object control module 312. The attached object data 332 indicates that the attached object 200 is coupled to the rear 202a of the target vehicle 202. The attached object data 332 also includes data about the position of the attached object relative to the vehicle 10 as provided in the vehicle environment data 320 and the dimensions of the attached object (the object depth 236 and the object width 238) from the object data 322.

The attached object control module 312 receives as input the attached object data 332. Based on the attached object data 332, the attached object control module 312 augments, alters or adjusts a position of a nearest fascia of the target vehicle 202, which in this example, is the rear fascia or rear 202a of the target vehicle 202, to account for the determination that the object is the attached object 200. In one example, the attached object control module 312 augments, alters or adjusts the position of the nearest fascia of the target vehicle 202 to include the object depth 236 and the object width 238 associated with the attached object. Stated another way, the attached object control module 312 extends the rear 202a of the target vehicle 202 by the object depth 236 and the object width 238 retrieved in the attached object list data 314 to account for the attached object 200 being attached to the target vehicle 202. Thus, generally, the attached object control module 312 merges the position of the target vehicle 202 with the dimensions (the object depth 236 and the object width 238) of the attached object 200 to form the augmented target vehicle boundary 250 that includes the attached object 200.

The attached object control module 312 outputs an attached object flag 334 to other modules of the vehicle 10 that indicates the object is attached to the target vehicle 202. The attached object control module 312 outputs braking control data 336 to the automatic braking system 47 that indicates that the position of the target vehicle 202 is the augmented target vehicle boundary 250 that includes the attached object 200. This ensures that the automatic braking system 47 outputs one or more control signals to the brake system 26 based on the augmented target vehicle boundary 250 that includes the attached object 200, which reduces inadvertent braking. The attached object control module 312 outputs longitudinal control data 338 to the longitudinal control system 45 that indicates that the position of the target vehicle 202 is the augmented target vehicle boundary 250 that includes the attached object 200. This ensures that the longitudinal control system 45 outputs one or more control signals to the brake system 26 and/or the propulsion system 20 based on the augmented target vehicle boundary 250 that includes the attached object 200, which reduces inadvertent braking and acceleration.

Figure 4:
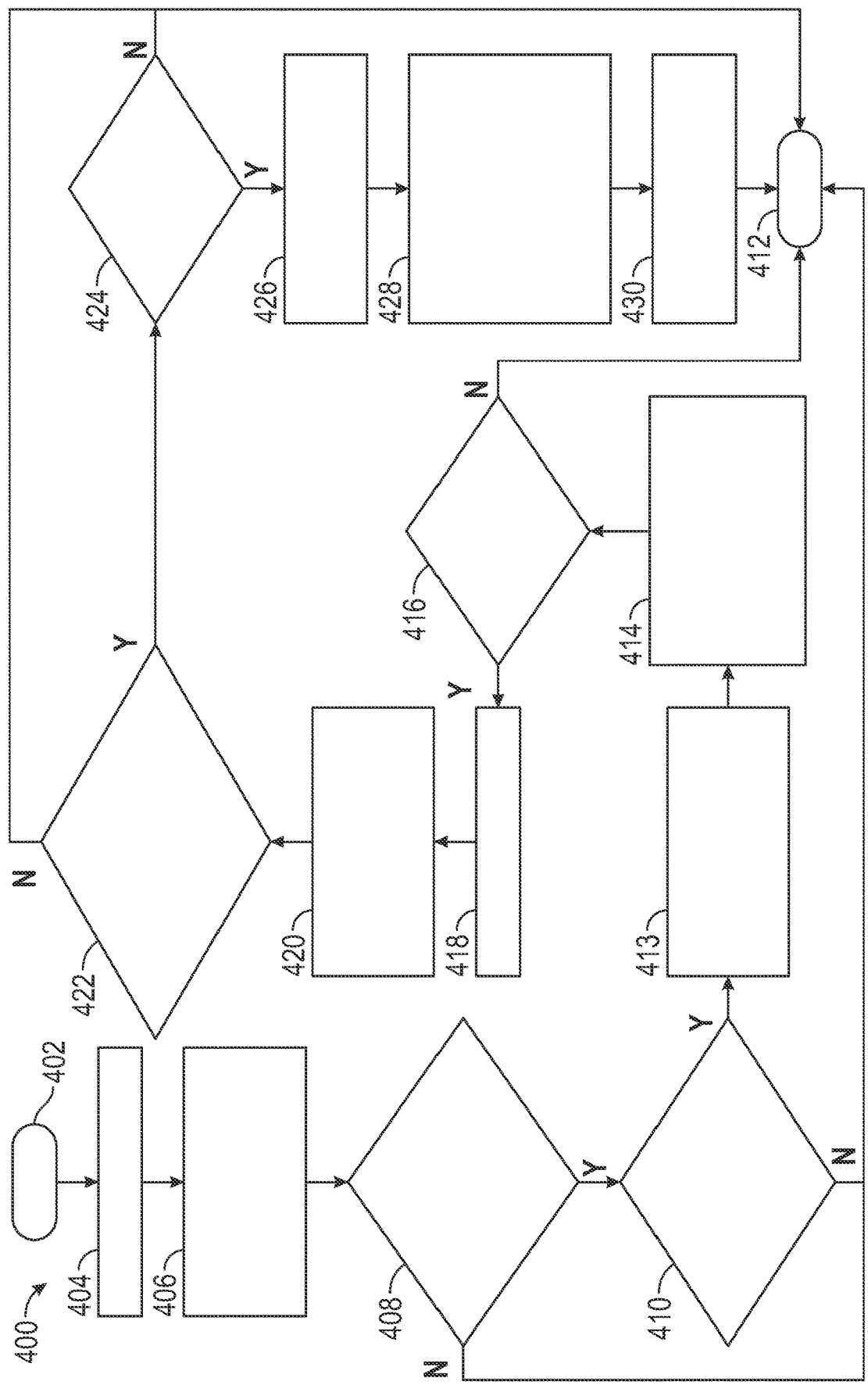
FIG. 4 is a flowchart illustrating a control method performed by the tracking control system of the vehicle in accordance with various embodiments.

Referring now to FIG. 4, and with continued reference to FIGS. 1-3, a flowchart illustrates a method 400 that can be performed by tracking control system 100 of FIG. 1 in accordance with the present disclosure. In one example, the method 400 is performed by the processor 44 of the controller 34. As can be appreciated in light of the disclosure, the order of operation within the method 400 is not limited to the sequential execution as illustrated in FIG. 4, but may be performed in one or more varying orders as applicable and in accordance with the present disclosure. In various embodiments, the method 400 can be scheduled to run based on one or more predetermined events, and/or can run continuously during operation of the vehicle 10.

The method begins at 402. At 404, the method 400 receives the sensor data 315 from the sensor system 28. For example, the method 400 receives the medium or short range sensor data 316 from the medium or short-range radar system 40a and the long-range sensor data 318 from the optical camera 40b and/or the long-range lidar 40c. At 406, the method 400 fuses the medium or short range sensor data 316 and the long-range sensor data 318 to generate the environment surrounding the vehicle 10 or the vehicle environment data 320. At 408, the method 400 determines whether an attached object type is identified in the environment surrounding the vehicle 10. For example, the method 400 retrieves the attached object list data 314 from the attached object datastore 300 and determines whether any of the objects identified in the environment surrounding the vehicle 10 match the objects provided in the attached object list data 314. If true, the method 400 proceeds to 410. If false, the method 400 ends at 412.

At 410, the method 400 determines whether a second vehicle, such as the target vehicle 202, is identified by the medium or short-range radar system 40a and the long-range sensing device 28b (at least one of the optical camera 40b and/or the long-range lidar 40c) in the environment surrounding the vehicle 10 or the vehicle environment data 320. If true, the method 400 proceeds to 413. Otherwise, the method 400 ends at 412.

At 413, the method 400 determines the distance 206 between the target vehicle 202 and the vehicle 10, which is provided by the vehicle environment data 320. At 414, the method 400 determines dimensions of the attached object region 240 associated with the target vehicle 202. In one example, the method 400 queries the object region datastore 308, and retrieves the dimension data 330 based on the distance 206 between the target vehicle 202 and the vehicle 10 provided by the vehicle environment data 320. At 416, the method 400 determines whether the object matched in the attached object list data 314 is positioned within the attached object region 240. For example, the method 400 determines, based on the vehicle environment data 320, whether the position of the object corresponds to or is within the dimensions of the attached object region 240 defined behind the rear 202a of the target vehicle 202. If true, the method 400 proceeds to 418. If false, the method ends at 412.

At 418, the method 400 sets the timer equal to zero. At 420, the method 400 determines the velocity of the object within the attached object region 240 and the velocity of the target vehicle 202. For example, the method 400 determines the velocity of the object in both the X and Y-directions relative to the vehicle 10 based on the vehicle environment data 320, and determines the velocity of the target vehicle 202 in both the X and Y-directions relative to the vehicle 10 based on the vehicle environment data 320. The method 400 determines the difference between the velocity of the object and the velocity of the target vehicle 202 in the X-direction, and determines the difference between the velocity of the object and the velocity of the target vehicle 202 in the Y-direction. The method 400 queries the threshold datastore 306, and retrieves the velocity threshold data 326 based on the distance 206 between the target vehicle 202 and the vehicle 10. The method 400 compares the difference between the velocities in the X-direction to the velocity threshold associated with the X-direction based on the distance 206, and compares the difference between the velocities in the Y-direction to the velocity threshold associated with the Y-direction based on the distance 206.

At 422, the method 400 determines whether the velocity of the object and the velocity of the target vehicle 202 in the X and Y-directions is within the velocity threshold data 326 based on the distance 206 between the target vehicle 202 and the vehicle 10 such that the object is likely moving with the target vehicle 202. If true, the method 400 proceeds to 424. If false, the method ends at 412.

At 424, the method 400 queries the threshold datastore 306, and determines whether the timer is greater than the timer threshold data 328. Stated another way, the method 400 determines whether the velocity of the object and the velocity of the target vehicle 202 in the X and Y-directions is within the velocity threshold data 326 over a period of time provided in the timer threshold data 328. If true, the method proceeds to 426. If false, the method ends at 412.

At 426, the method 400 determines that the object is attached to the vehicle 10, and outputs the attached object flag 334 to the other modules associated with the vehicle 10. At 428, the method 400 augments, alters, or modifies the nearest fascia of the target vehicle 202 to include the attached object 200. For example, the method 400 extends the rear 202*a* of the target vehicle 202 by the object depth 236 and the object width 238 retrieved in the attached object list data 314 to generate the augmented target vehicle boundary 250. At 430, the method 400 controls the vehicle 10 based on the augmented target vehicle boundary 250. For example, the method 400 outputs the braking control data 336 to the automatic braking system 47 to indicate that the position of the target vehicle 202 is the augmented target vehicle boundary 250, which includes the attached object 200. The method 400 outputs the longitudinal control data 338 to the longitudinal control system 45 that indicates that the position of the target vehicle 202 is the augmented target vehicle boundary 250, which includes the attached object 200. The automatic braking system 47 outputs one or more control signals to the brake system 26 based on the augmented target vehicle boundary 250, and the longitudinal control system 45 outputs one or more control signals to the brake system 26 and/or the propulsion system 20 based on the augmented target vehicle boundary 250. The method ends at 412.

Thus, the tracking control system 100 reduces inadvertent braking of the vehicle 10 based on objects that are attached to the target vehicle 202. In addition, the tracking control system 100 also reduces inadvertent accelerations based on objects that are attached to the target vehicle 202. Generally, the tracking control system 100 provides an appropriate stopping distance and appropriate following distance when objects are attached to the target vehicle 202. This provides a more enjoyable driving experience for the occupants of the vehicle 10. In addition, it should be noted that the tracking control system 100 is not limited to providing control data to the longitudinal control system 45 and/or the automatic braking system 47. Rather, the tracking control system 100 may provide the augmented target vehicle boundary 250 to other systems associated with the vehicle 10, including, but not limited to a forward assistance system, an avoidance system, etc.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A method for tracking attached objects for controlling a vehicle, comprising:
    receiving, by a processor, sensor data of an environment associated with the vehicle observed by at least one radar system associated with the vehicle and at least one of a camera and a lidar associated with the vehicle, the sensor data including an object;
    determining, based on the sensor data, whether the object in the environment of the vehicle corresponds to an attached object type;
    determining, by the processor, whether the sensor data includes a second vehicle;
    determining, by the processor, an attached object region associated with the second vehicle based on a distance between the second vehicle and the vehicle;
    determining, by the processor, whether a position of the object is within the attached object region;
    based on the determining the object is within the attached object region, determining, by the processor, whether a difference between a velocity of the object and a vehicle velocity of the vehicle is within a velocity threshold based on the distance;
    based on the determining the difference is within the velocity threshold, determining, by the processor, that the object is an attached object that is attached to the second vehicle; and
    controlling, by the processor, the vehicle based on the determining that the object is the attached object.

2. The method of claim 1, wherein the attached object type includes at least one of a bike, bicycles, a motorcycle, a mobility aid, a scooter, a rack, and a cargo carrier.

3. The method of claim 1, wherein the determining the attached object region further comprises:
    determining, by the processor, a depth and a width of the attached object region based on the distance, and defining the attached object region relative to a fascia of the second vehicle based on the depth and the width.

4. The method of claim 3, further comprising:
    based on the determining of the attached object, augmenting, by the processor, the fascia of the second vehicle by at least one of an object depth and an object width associated with the attached object to generate an augmented second vehicle boundary that includes the attached object.

5. The method of claim 4, wherein controlling the vehicle further comprises:
    controlling, by the processor, an automatic braking system of the vehicle based on the augmented second vehicle boundary.

6. The method of claim 4, wherein controlling the vehicle further comprises:
    controlling, by the processor, a longitudinal control system of the vehicle based on the augmented second vehicle boundary.

7. The method of claim 1, further comprising:
    based on the determining the difference is within the velocity threshold, determining, by the processor, whether the difference is within the velocity threshold over a period of time.

8. The method of claim 1, wherein the determining whether the sensor data includes the second vehicle is based on the determining the object corresponds to the attached object type.

9. A system for tracking attached objects for controlling a vehicle, comprising:
    a sensor system including at least one radar system and at least one of a camera and a lidar, the sensor system configured to generate sensor data of an environment associated with the vehicle that includes an object;
    a controller, having a processor configured to:
        determine whether the object in the environment of the vehicle corresponds to an attached object type based on the sensor data;
        determine whether the sensor data includes a second vehicle;
        determine an attached object region associated with the second vehicle based on a distance between the second vehicle and the vehicle;
        determine whether a position of the object is within the attached object region;
        determine whether a difference between a velocity of the object and a vehicle velocity of the vehicle is within a velocity threshold based on the distance and based on the determination that the object is within the attached object region;

determine that the object is an attached object that is attached to the second vehicle based on the determination that the difference is within the velocity threshold; and control the vehicle based on the determination that the object is the attached object.

10. The system of claim 9, wherein the attached object type includes at least one of a bike, bicycles, a motorcycle, a mobility aid, a scooter, a rack, and a cargo carrier.

11. The system of claim 9, wherein the attached object region includes a depth and a width based on the distance, and the processor is configured to define the attached object region relative to a fascia the second vehicle based on the depth and the width.

12. The system of claim 11, wherein the processor is configured to augment the fascia of the second vehicle by at least one of an object depth and an object width of the attached object to generate an augmented second vehicle boundary that includes the attached object.

13. The system of claim 12, wherein the processor is configured to control the vehicle by outputting the augmented second vehicle boundary to an automatic braking system of the vehicle.

14. The system of claim 12, wherein the processor is configured to control the vehicle by outputting the augmented second vehicle boundary to a longitudinal control system of the vehicle.

15. The system of claim 9, wherein the processor is configured to determine whether the difference is within the velocity threshold over a period of time.

16. The system of claim 9, wherein the processor is configured to determine whether the sensor data includes the second vehicle based on the determination that the object corresponds to the attached object type.

17. A method for tracking attached objects for controlling a vehicle, comprising:

receiving, by a processor, sensor data of an environment associated with the vehicle observed by at least one radar system associated with the vehicle and at least one of a camera and a lidar associated with the vehicle, the sensor data including an object;

determining, based on the sensor data, whether the object in the environment of the vehicle matches an attached object type;

determining, by the processor, whether the sensor data includes a second vehicle;

determining, by the processor, an attached object region associated with the second vehicle based on a distance between the second vehicle and the vehicle, the attached object region including a depth and a width based on the distance;

defining, by the processor, the attached object region relative to a fascia the second vehicle based on the depth and the width;

determining, by the processor, whether a position of the object is within the attached object region;

based on the determining the object is within the attached object region, determining, by the processor, whether a difference between a velocity of the object and a vehicle velocity of the vehicle is within a velocity threshold based on the distance;

based on the determining the difference is within the velocity threshold, determining, by the processor, that the object is an attached object that is attached to the second vehicle; and controlling, by the processor, at least one of a longitudinal control system and an automatic braking system associated with the vehicle based on the determining that the object is the attached object.

18. The method of claim 17, wherein the attached object type includes at least one of a bike, bicycles, a motorcycle, a mobility aid, a scooter, a rack, and a cargo carrier.

19. The method of claim 17, further comprising:

based on the determining of the attached object, augmenting, by the processor, the fascia of the second vehicle by at least one of an object depth and an object width of the attached object to generate an augmented second vehicle boundary that includes the attached object.

20. The method of claim 17, wherein the determining whether the sensor data includes the second vehicle is based on the determining the object matches the attached object type.

* * * * *